Oct. 7, 1969 G. W. YARBER ETAL 3,471,105
STABILIZATION CONTROL SYSTEM
Filed March 28, 1966 4 Sheets-Sheet 1

GORDON W. YARBER
KUO T. CHANG
INVENTORS.

BY H. Vincent Harsha
ATTORNEY

GORDON W. YARBER
KUO T. CHANG
INVENTORS.

BY H. Vincent Harsha

ATTORNEY

GORDON W. YARBER
KUO T. CHANG
INVENTORS.

BY H. Vincent Harsh
ATTORNEY

United States Patent Office 3,471,105
Patented Oct. 7, 1969

3,471,105
STABILIZATION CONTROL SYSTEM
Gordon W. Yarber, Malibu, and Kuo T. Chang, Redondo Beach, Calif., assignors to The Garrett Corporation, Los Angeles, Calif., a corporation of California
Filed Mar. 28, 1966, Ser. No. 538,030
Int. Cl. B64g 1/20
U.S. Cl. 244—1　　　　　　　　　　　　　6 Claims

ABSTRACT OF THE DISCLOSURE

A stabilization system for a body rotating about a principal axis, such as a space vehicle. A disturbing couple on the rotary body causes rapid precession. By applying a gyroscope couple in a direction counter to the precession couple and by absorbing excess kinetic energy the precession can be quickly dampened.

---

Figure 1:
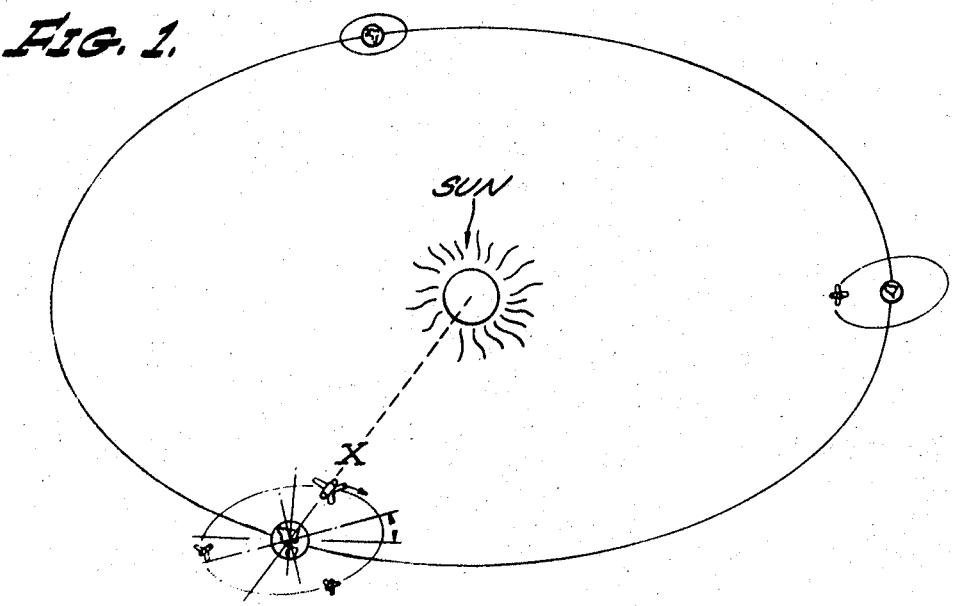

This invention relates to orbiting space vehicles and more particularly to such space vehicles that have a rotating body which is spin stabilized and rotated about its major principal axis.

The general configuration of such a space station is a central hub with a plurality of radial modules protruding therefrom. The station is capable of being in orbit for long periods of time and indeed is designed to have on board a manned laboratory, also, if required, to provide for replacement of the men at prescribed intervals. In any orbiting body, such as that with which the present invention is concerned, there are necessarily a plurality of control systems required. These control systems are required to perform the various functions such as maintaining at proper and predetermined levels or positions the orbit, the dynamic balance, the attitude of the space station and the body angular rate. These functions must be controlled for proper stability and correct orientation of the space station when the station is in near earth orbit. Each of the control systems is a requisite to the proper functioning of the space station and indeed necessary for the comfort and safety of the crew if it is a manned space station.

The body angular rate control or precession control method used in this invention is of the active damping type. Active damping is required to reduce the coning angle at some prescribed rate, e.g., from 1° to 0.1° in 5 minutes, or from 5° to 0.5° in 30 minutes under different operational requirements. The flexibility of the space vehicle and sloshing movement of liquids aboard the space station would provide passive damping and inherent stability to the space station so that precession would eventually be reduced to zero. However, natural or passive damping does not perform the requisite damping function in an adequately short time.

A disturbed rotating space station will have gyroscopic precession or wobble, and in order to correct for excessive wobble there must be a transfer of angular momentum from the equatorial axis to the spin axis. The transfer of momentum must also provide for absorption of the excess kinetic energy which has been imparted to the space station. Excess kinetic energy or disturbing forces may result from a variety of causes amongst which may be impact such as a moment caused by the docking of a space ship alongside, or an external force of other nature acting on the space vehicle, such as rotating machinery, magnetic fields, aerodynamic forces, thrust mis-alignment. These and other forces would cause a wobble or precession of the space vehicle.

The basic dynamics of a rotating spin stabilized space vehicle must be considered in the methods for controlling the space vehicle.

One of the primary dynamic forces is the gyroscopic couple. In spin stabilized space vehicles gyroscopic couples are produced as a result of the vehicle being essentially a revolving fly wheel or momentum wheel whereby any force acting off the center of mass upon the vehicle produces a gyroscopic couple. Another basic rule of dynamics is that a space vehicle spinning about its mass center with a constant angular momentum will have this angular momentum changed only when the vehicle is acted upon by an external moment. A rotating space vehicle is inherently stable when the vehicle is spinning about the axis with the greatest moment of inertia. Inherent stability about the major principal axis is due to this motion having the least kinetic energy for any specific angular momentum. Since internal damping reduces the kinetic energy of the vehicle without changing the angular momentum, the ultimate rotation will always be about the major principal axis. If the principal axes of the vehicle are selected as reference axes, the products of inertia terms disappear.

Due to the inherent dynamics of a rotating space vehicle the control systems may have many different characteristics. The wobble or precession may be reduced by the use of internal forces inasmuch as the angular momentum of the space vehicle need not be changed when wobble is present. Active or passive damping will eventually reduce the wobble to zero if no additional forces are subsequently added to the original disturbing forces that caused the precession.

Active damping is preferred in most rotating space vehicles since it reduces both the time for complete damping and also reduces the total mass that must be moved to effect control. This invention provides active damping that reduces the time to a minimum to bring precession to zero and provides a system wherein the mass that must be moved relative to the spinning body is minimized. It is necessary to stabilize the rotating space vehicle rapidly to provide for crew comfort in the case of a manned space vehicle and to provide for accurate positioning in the case of an unmanned vehicle.

This invention utilizes a gimballed momentum wheel mechanism to provide the correcting or stabilizing force to reduce to zero as rapidly as possible the precession or wobble of the space vehicle. The stabilizing control system of this invention uses dividing accelerometers to sense the coning angle and initiate stabilizing action when the angle $\theta$ is in excess of a predetermined magnitude. The control system also utilizes the frequency of the wobble to control the speed of the outer gimbal servo motor drive and thus maintain the momentum wheel in correct alignment so that its gyroscopic couple can be used most effectively to reduce the precession.

This invention provides an accurate and rapid stabilizing system which is very light in weight when compared with prior art systems. The gyroscopic action of this invention provides rapid active damping action with a minimum of power usage.

Furthermore, this invention provides a stabilization control system which is extremely accurate and sensitive to relatively small changes in the precession angle. The active damping control system of this invention produces the requisite forces with a minimum of control circuitry and thus further provides for weight reduction and reduced power requirements in the space vehicle.

Figure 2:
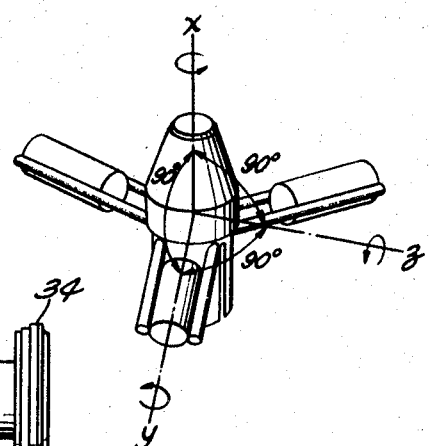
Figure 3:
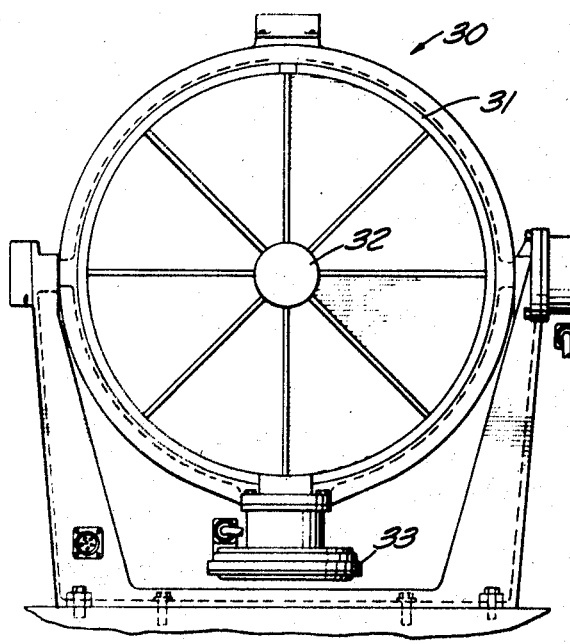
Figure 3A:
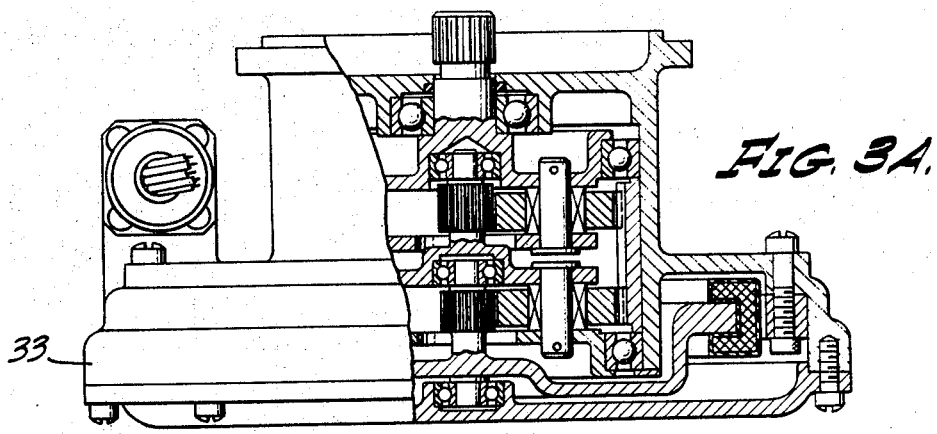
Figure 3B:
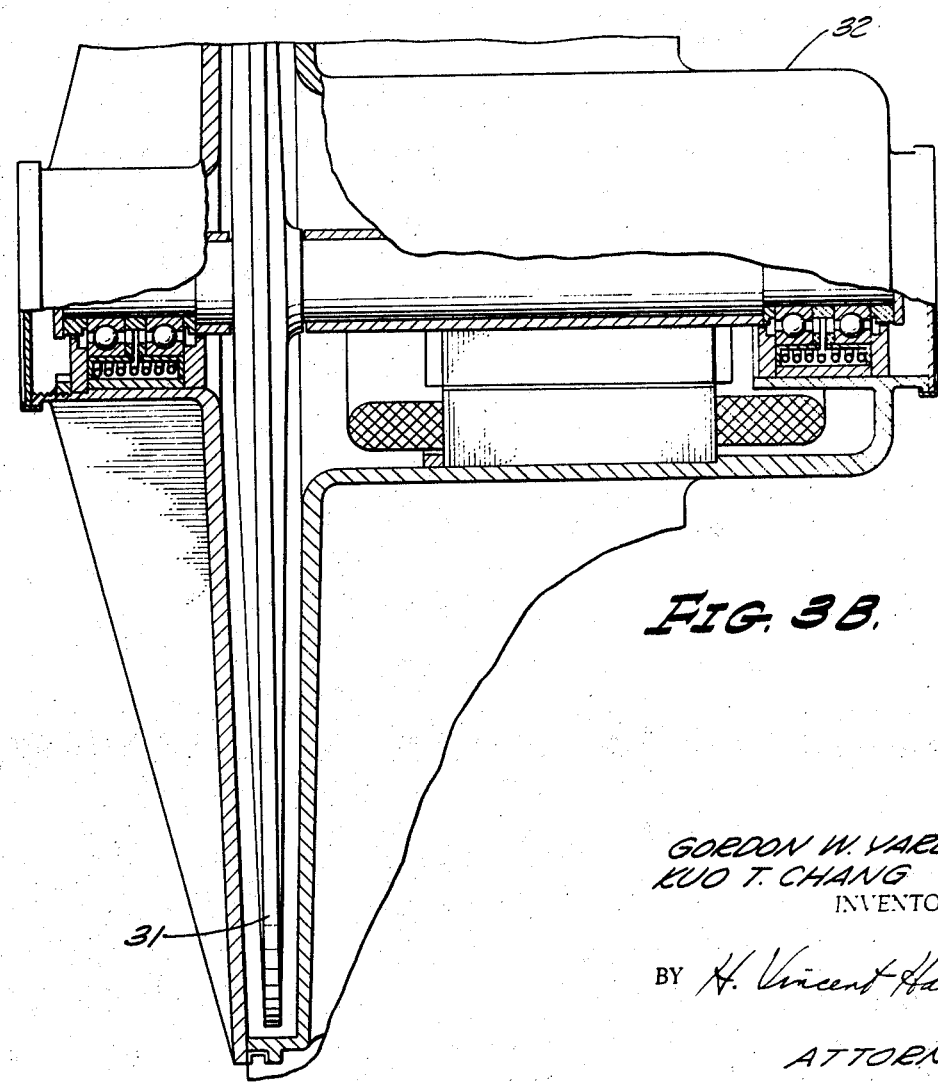
Figure 4:
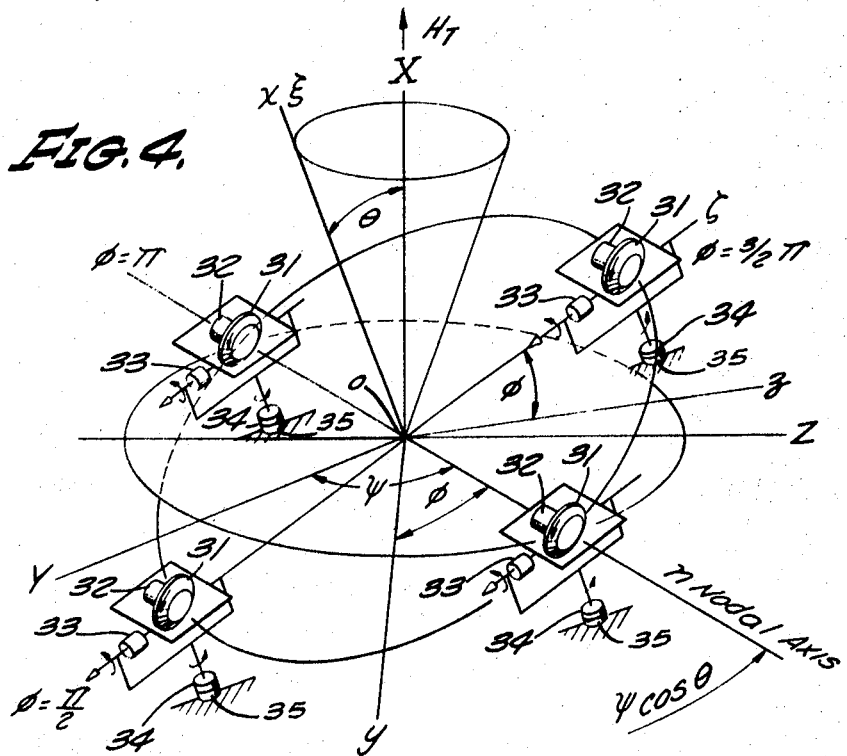
Figure 5:
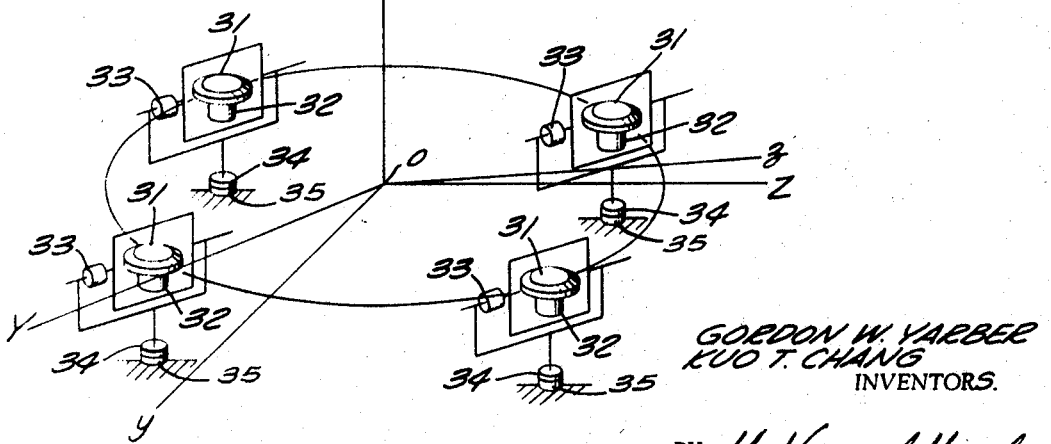
Figure 4A:
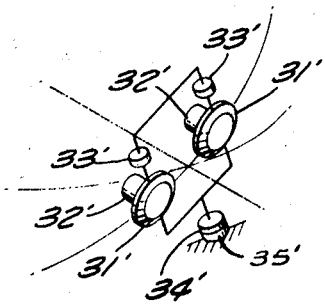
Figure 5A:
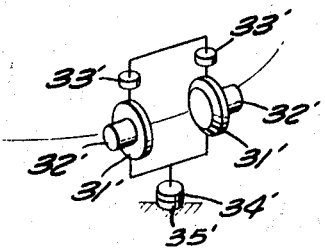
Figure 6:
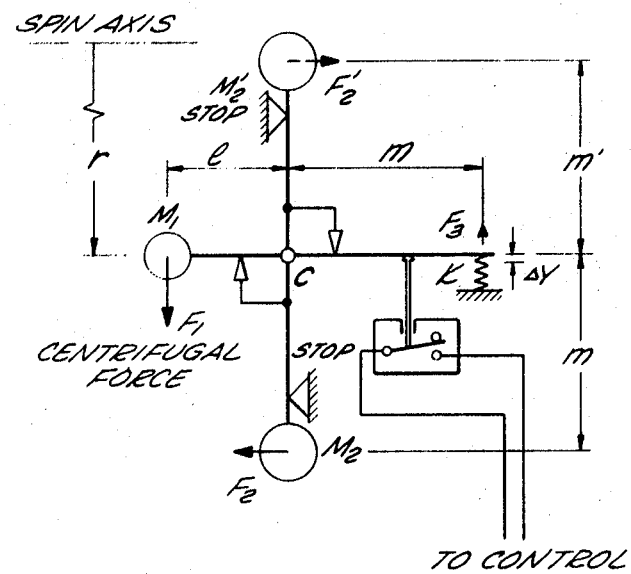

These and other advantages of this invention will become apparent when the following detailed description is studied in conjunction with the drawings, wherein FIG. 1 is a schematic representation of the orbital system of a space vehicle employing this invention. FIG. 2 is a schematic representation of one configuration of a space vehicle which would employ this invention with the principal axes shown thereon. FIG. 3 is an elevational view of one embodiment of a precession stabilizer useful in this invention. FIG. 3b is a cross section of momentum wheel of FIG. 3. FIG. 3a is a cross section of the gimbal actuators of FIG. 3. FIG. 4 is a schematic diagram showing the principal elements employed in precession control in an active position. This figure is drawn from the viewpoint of an observer who is fixed relative to the rotating nodal axis. The four assemblages in FIG. 4 represent four positions of a single device with respect to time. Since the nodal axis rotates faster than vehicle rotation, the control assemblage regresses with respect to the observer and the spin axis of the momentum wheel constantly maintains its direction parallel to the nodal axis. FIG. 4a is another embodiment of a control means in an active state. FIG. 5 is a schematic further depicting the principles of precession control when the principal element is in a passive state. FIG. 5a is another embodiment of a control means in a passive state, and FIG. 6 is a schematic diagram of a wobble sensing system useful in this invention.

FIG. 1 shows the orbital path of the space vehicle around the earth and the orbital path of the earth around the sun.

FIG. 2 illustrates one configuration of a space vehicle which is adaptable to utilizing this invention. This invention may be used with many other configurations of rotating space vehicles. The body fixed axes $x$, $y$ and $z$ are as shown in FIG. 2. The fixed body axes should be similarly located in any rotating space vehicle using this invention.

As shown in FIG. 4, the X, Y and Z axes are the fixed space axes and the $\xi$, $\eta$ and $\zeta$ are precession axes. Each set of these axes must be orthogonal and its origin must coincide with the mass center O as shown in FIG. 4. The fixed space axes have the X axis parallel to the total angular momentum vector of the vehicle, and the Y–Z plane is perpendicular to X.

The motion of the space vehicle may be defined in terms of the body fixed axes rotating relative to the space axes. The $x$ axis shall be the spin axis and shall coincide with the space axis X when the space vehicle is stabilized without wobble. The $y$ and $z$ axes are the equatorial axes and shall be fixed in the body. The precession axes rotate relative to both the space and body axes. The $\xi$ axis coincides with the body axis $x$. The $\eta$ axis shall be called a nodal axis and always must be contained in both the Y–Z and $y$–$z$ planes. The $\zeta$ axis is always in the $y$–$z$ plane. The $\eta$ and $\zeta$ axes rotate about the space axis X at an angular speed $\dot{\Psi}$. The axes of the space vehicle may be drawn in any set of orthogonal planes. The angular momentum vector is shown in the plane of the paper and represented in a vertical direction therefrom.

The use of the Euler equations is necessary to the mathematical analysis and understanding of the system of this invention. The mathematical analysis will be explained in terms of FIGS. 4 and 5. The Eulerian angles are $\Psi$, $\theta$ and $\phi$ which can be used to completely define the position of the rotating body.

The moving body axes $x$, $y$ and $z$ initially coincide with the fixed axes X, Y and Z and the space body is rotated about the X-axis through the angle $\Psi$ by the rotating action of the space body which is counterclockwise. This rotation brings the $y$-axis to the new position $\eta$; next, the body is rotated about this nodal axis $\eta$ through an angle $\theta$. The $x$-axis is now separated from X by $\theta$ and is identified as $\xi$. Lastly, the body is rotated about $\xi$ through an angle $\phi$. The final positions of the $x$, $y$ and $z$ axes are as shown in FIG. 4. The $\zeta$ axis is orthogonal to both $\eta$ and $\xi$. In defining the sign of rotation, the right hand rule is used.

The angular velocities of the space vehicle are defined as follows:

$\omega_x$ = the angular velocity about the spin axis $x$.
$\omega_y$ = the turning velocity about the $y$-axis.
$\omega_z$ = the turning velocity about the $z$-axis.
$\dot{\Psi}$ = the turning velocity of the nodal axis $\eta$ about the X-axis or the rate of precession.
$\dot{\phi}$ = the relative turning velocity of the body axes $y$ and $z$ about the $x$ and $z$ axes. This relative turning velocity is relative to $\dot{\Psi}$.

The angular velocity is resolved along the $x$, $y$ and $z$ axes so that the orthogonal components are as follows:

$\omega_x = \dot{\Psi} \cosine \theta + \dot{\phi}$
$\omega_y = \dot{\Psi} \sine \theta \sine \phi + \dot{\theta} \cosine \phi$
$\omega_z = \dot{\Psi} \sine \theta \cosine \phi - \dot{\theta} \sine \phi$ and thus when $\dot{\theta}$ is equal to 0, the angular velocity about each body axis is:

$\omega_x = \dot{\Psi} \cosine \theta + \dot{\phi}$
$\omega_y = \dot{\Psi} \sine \theta \sine \phi$
$\omega_z = \dot{\Psi} \sine \theta \cosine \phi$ In order to mathematically study the motion of the space vehicle and the invention, the effects of the moment of inertia must be considered. The principal axes are selected with their center at the center of mass of the space vehicle. When the angular momentum about each axis is expressed under the express condition that the principal axes of the body of the space vehicle coincide at the mass center, the angular momentum may be expressed by the following equations:

$$H_x = I_x \omega_x$$
$$H_y = I_y \omega_y$$
$$H_z = I_z \omega_z$$

In accordance with Newton's laws of motion, the space vehicle will rotate about its mass center unless acted upon by an external force. A space body which is spinning about one of its principal axes will continue to spin indefinitely about that axis if all external forces are removed and none of its kinetic energy is absorbed.

The angular momentum of the entire space vehicle and its contents remains constant in accordance with Newton's first law unless acted upon by an external force or moment. It is possible to transfer the angular momentum from one axis to another by means of internal torques, but the vector sum of the angular momentums about all axes remains constant as if the space vehicle were spinning about one axis.

The total kinetic energy (T) of the space vehicle may be proven to be $T = \frac{1}{2}(I_x \omega_x^2 + I_y \omega_y^2 + I_z \omega_z^2)$.

It may be mathematically determined that the total kinetic energy of the space vehicle during wobble, and under the condition that $I_y = I_z$, is expressed by the following equation:

$$T = \frac{1}{2} I_x \omega_x^2 \left[ 1 + \frac{I_x}{I_y} \left( \frac{\sine^2 \theta}{1 - \sine^2 \theta} \right) \right]$$

When there is no wobble, that is when $\theta = 0$, the kinetic energy of the space vehicle is, $T_1$ $$T_1 = \frac{1}{2} I_x \omega_0^2$$

When kinetic energy $\Delta T$ is added to the space vehicle, without changing the total angular momentum, the total kinetic energy (T) can be expressed by the following equation:

$$T = T_1 + \Delta T$$

When $I_x$ is greater than $I_y$ or $I_z$ and simultaneously $I_y$ is or is not equal to $I_z$, the kinetic energy of the space vehicle must be increased to cause wobble. In other words, the kinetic energy of the space vehicle during wobble exceeds the kinetic energy present in the space vehicle when it is spinning only about the major principal axis. If the mass movement aboard the space vehicle is made in such a manner that the symmetry of the transverse axes is maintained, the coning angle $\theta$ may be expressed in the following equation:

$$\theta = \sin^{-1} \sqrt{\frac{\Delta T}{T_I}\left(\frac{I_y}{I_x - I_y}\right)}$$

From this equation it may easily be ascertained that $\theta$ or the wobble angle can be brought to 0 by bringing $\Delta T$ to 0. Thus, if the excess kinetic energy $\Delta T$ present when the space vehicle is wobbling is absorbed, the wobble will be effectively damped. The angular momentum vectors which are aligned with the precession axes, namely $\xi$, $\eta$ and $\zeta$, mathematically prove that H can be represented in direction by the two axes $\xi$ and $\zeta$ when the wobble angle $\theta$ is constant. In this situation the total kinetic energy of the space station is $$T = T_\xi + T_\zeta$$

The kinetic energy added to the space vehicle to cause the wobble may be partially dissipated and may be partially transferred to the spin axis $x$ to bring the total kinetic energy of the space vehicle to its former state. Since there is no motion about the nodal axis, $T_{I\eta} = 0$, the total kinetic energy to be either transferred or dissipated in the space vehicle is concentrated in the transverse axis $\zeta$. Since the excess kinetic energy is concentrated in this one axis, it is possible to control the transfer and dissipation of added kinetic energy in the $\zeta$ axis in an amount and direction such that $\theta$ will be reduced to 0.

The energy dissipated in bringing $\theta$ to zero is:

$$\Delta T = T_I \left(\frac{I_x - I_y}{I_y}\right) \sin^2 \theta$$

The energy to be transferred to the spin axis, $x$ or $\xi$, is $\Delta T_x = T_I \sin^2 \theta$.

When the $\xi$, $\eta$, and $\zeta$ axes are used to consider the kinetic energy of the space vehicle, the energy is divided between the $\xi$ and $\zeta$ axes since $\omega_\eta = 0$.

The total energy to be transferred and dissipated therefore, is in the transverse axis, $\zeta$. The control can be applied on this axis in a direction to reduce $\theta$ to zero.

Before control is applied, $$H = H_\xi \bar{i} + H_\eta \bar{j} + H_\zeta \bar{k} = \text{constant}$$

$$\omega_\xi = \dot{\psi} \cos \theta = \text{constant}.$$

$$\omega_\eta = \dot{\theta} = 0$$

$$\omega_\zeta = \dot{\psi} \sin \theta = \text{constant}.$$

Let $I_1$ = the moment of inertia of either transverse axis and the following equations may be written:

$$H_\xi = I_x \omega_x = I_x(\dot{\psi}\cos\theta + \dot{\phi})$$

$$H_\eta = I_1 \omega_\eta = I_1 \dot{\theta} = 0$$

$$H_\zeta = I_1 \omega_\zeta = \dot{\psi} \sin \theta$$

The control can be applied in a manner to reduce $\theta$ by applying a torque to the space vehicle about the $\zeta$ axis. This will cause the vehicle to rotate about the nodal axis, $\eta$. A constant torque can be applied in a continuous manner by following the $\zeta$ axis. A source of corrective torque can be achieved by use of a momentum wheel rotating with an angular momentum, $$H_w = I_w \omega_w$$

If the momentum wheel is positioned with its axis of rotation at right angles to the spin axis of the space vehicle, the rotation of the vehicle will produce a torque, $$T_o = I_w \omega_w \omega_x$$

However, this torque will not always be applied in the correct direction since the angle $\theta$ is in a plane rotating at a speed $\dot{\psi}$ and not $\omega_x$. Now if the momentum wheel axis is caused to rotate about the axis perpendicular to its spin axis at the precession rate, $\dot{\psi}$, the torque produced will be:

$$T_o = I_w \omega_w \dot{\psi}$$

Then, if the momentum wheel's axis is held parallel to the nodal axis, $\eta$, the torque will be applied about the $\zeta$ axis in accordance with the right angle characteristics of the gyroscopic couple.

Since the momentum wheel will be rotated to hold its axis parallel to the $\eta$ axis, the angular momentum of the wheel, $H_w$, will be added to this axis. Now the total angular momentum H of the space vehicle is expressed by the equation:

$$\bar{H} = H_\xi \bar{i} + (I_1 \dot{\theta} + H_w)\bar{j} + H_\zeta \bar{k}$$
$$= I_x \omega_x \bar{i} + (I_1 \dot{\theta} + I_w \omega_w)\bar{j} + I_1 \dot{\psi} \sin \theta \bar{k}$$

Since $\dot{\psi} = \frac{I_x}{I_y}\omega_o = \frac{I_x}{I_1}\omega_o$ $$\bar{H} = H \cos \theta \bar{i} + (I_1 \dot{\theta} + I_w \omega_w)\bar{j} + I_1 \frac{I_x}{I_1} \omega_o \sin \theta \bar{k}$$

$$= H \cos \theta \bar{i} + (I_1 \dot{\theta} + I_w \omega_w)\bar{j} + H \sin \theta \bar{k}$$

$$H^2 = H^2 \cos^2 \theta + (I_1 \dot{\theta} + I_w \omega_w)^2 + H^2 \sin^2 \theta$$

$$H^2 = H^2(\cos^2 \theta + \sin^2 \theta) + (I_1 \dot{\theta} + I_w \omega_w)^2$$

Note: $(\cos^2 \theta + \sin^2 \theta = 1)$

Then $I_1 \dot{\theta} + I_w \omega_w = 0$

The angular momentum of the momentum wheel used to control wobble is:

$$H_w = I_w \omega_w = I_1 \dot{\theta}$$

and the angular rate of reducing $\theta$ can be found by the relationship:

$$\dot{\theta} = \frac{I_w \omega_w}{I_1} = \frac{H_w}{I_1}$$

This invention provides a novel method of solving the control problem of a rotating space vehicle. The space vehicle must be controlled so as to maintain a wobble angle at or near zero in spite of forces applied to it. To reduce the wobble angle $\theta$ to 0, this invention provides a unique way to apply a torque to the space vehicle so as to rotate the vehicle about the $\eta$ axis.

FIG. 3 depicts a momentum wheel 31 in conjunction with the stabilizer or gyroscope 30. The momentum wheel 31 is set in rotation by means of a suitable motor 32. Such a motor could very easily be an induction or synchronous motor. The gyroscope also includes two torquing motors 33 and 34. These motors are inner and outer gimbal actuator motors, respectively. The gimbal actuator motors provide the requisite torque to align the gimbals so that the wobble angle of the space vehicle is reduced to 0. The outer gimbal motor 34 drives the outer gimbal shaft until the spin axis of the wheel is parallel to or coincides with the nodal axis of the space vehicle. In addition, the outer gimbal shaft must be controlled at a speed greater than the spin speed of the space vehicle and in the same direction as the spin speed of the space vehicle. This gives a gimbal rate greater than the vehicle spin speed and an absolute speed which is equal in value and direction to the rate of precession. In the spin stabilized space vehicle utilizing the present invention to reduce the wobble angle, the outer gimbal motor will supply little or no positive torque. This torque requirement of the outer gimbal motor occurs because the gyroscopic forces of the momentum wheel action tend to drive the momentum wheel faster than the precession speed. A brake 35 will be required and this is normally a fluid braking device which is an integral part of the motor and, though not shown in detail, any viscous damped brake means may be used, and indeed the outer gimbals are normally viscously damped to accomplish this braking action. The power requirements for the outer gimbal motor are thus minimal since it is only required to accurately position the momentum wheel.

The inner gimbal motor is necessary to activate the gyroscopic effect of the momentum wheel when the wobble angle of the space vehicle has reached a predetermined value. The control mechanism for ascertaining when the space vehicle wobble angle has reached a predetermined value is shown in FIG. 6. This wobble sensor will be described in more detail later on, but the signals activating the inner gimble motor 33 are generated by this or a similar wobble sensing device. There is no gyroscopic effect of the momentum wheel when the shaft of the momentum wheel is aligned with the angular momentum vector of the space vehicle. Upon a proper signal from the wobble sensing device, the gyroscopic effect of the momentum wheel must be provided to effectively reduce the wobble angle of the space vehicle to 0. The spinning momentum wheel shaft now must be rotated into the equatorial plane and locked into this position. Position of the momentum wheel and the gimbal torque motors as for a wobble angle of $\theta$ is completely depicted in FIG. 4. This action presupposes that the momentum wheel is continuously rotated at a speed which is sufficient to provide the gyroscopic action of the momentum wheel. Such speed is a function of the weight and diameter of the momentum wheel. The inner gimbal motor must provide sufficient torque to bring the spinning momentum wheel shaft into the equatorial plane so that the gyroscopic effect of the momentum wheel is now activated to reduce the wobble angle to 0. It would be beneficial if the momentum wheel is always moved so that the resultant momentum vectors are at right angles to the nodal axis. It is possible to program the control movement of the spinning momentum wheel so that the motion starts at 90° to the nodal axis and then is moved until the motion is parallel to the nodal axis but always through a path so that the resultant torque is at right angles to the nodal axis. Such a program is not specifically set forth or described because it is mathematically derivable and mechanization of the arrangement is feasible. It is also possible to eliminate the inner gimbal torque motor if the momentum wheel is brought up to speed only when stabilization is required. In other words, the at-rest position of the momentum wheel would be, as shown in FIG. 4, perpendicular to the vehicle spin axis and the gimbal supporting the momentum wheel locked into this position. However, a much larger momentum wheel motor 32 would be required under these circumstances and the power requirements would be increased over the method shown in FIGS. 4 and 5. It is also possible to generate the requisite gyroscopic effect by the use of twin gimbals, as shown in FIGS. 4a and 5a. In this instance, the gimbals have both inner and outer torquing motors 33' and 34', a brake 35' and a motor 32' for rotating each momentum wheel. However, because the momentum wheels are rotated in opposite directions to reach their active position, there is no requisite for programming the rotation of the axes of the wheels into their operable position. Each momentum wheel is producing an equal and opposite effect other than the angular momentum directed along the nodal axis so that the total resultant effect on the spinning space vehicle is that of a rotating vector along $\eta$ only.

FIG. 6 shows a wobble sensing device which is useful in this invention. This wobble sensing device starts and stops the precission control system when the wobble angle exceeds a predetermined value. In FIG. 6 the mass $M_1$ is used to supply force $F_1$ that is a function of the spin speed $\omega_x$. The mass $M_1$ is spaced at a radius $r$ from the spin axis of the body. The masses $M_2$ and $M'_2$ are equal but independently pivoted at point C. The mass $M_1$ is located a distance 1 from the point C, and the spring K is located at the opposite end of the lever and is spaced a distance $m$ from the point C. These masses $M_2$ and $M'_2$ neutralize the plus and minus forces which are generated by the sinusoidal action of the space vehicle during wobble. The stops for the levers supporting the masses $M_2$ and $M'_2$ and the base of the spring K are rigidly fixed to the vehicle. When wobble about the spin axis occurs the stops oscillate generally horizontally, as viewed in FIG. 6, and impose inertia forces $F_2$ and $F'_2$ on the lever interconnecting the mass $M_1$ and spring K, as indicated by the arrows adjacent the center C in FIG. 6. The motion of the spring K in response to the wobble force is defined as $\Delta Y$ and the spring rate is defined as K. If the spring rate K is low and the $\Delta Y$ motion is very small, the spring rate times the $\Delta Y$ motion times the motion of M approaches zero. $K\Delta Ym \to 0$ then, if it is desired to have the switch close its contact with the space vehicle, wobbling with the predetermined angle $\theta$ (FIG. 4), the masses and moment arms of the sensor of FIG. 6 must have the following relationship:

$$\left(\frac{I_x - I_y}{I_y}\right)^2 \theta_1 \cong \frac{M_1 l}{M_2 m}$$

Thus the sensor device of FIG. 6 senses the degree of wobble of the space vehicle. When the inertia forces $F_2$ and $F'_2$ are sufficiently great to overcome the force of the spring K, the switch is closed to energize a circuit causing the motor 33 to swing the wheel 31 from the position shown in FIG. 5 to the position shown in FIG. 4 and thereby allowing the operation of torquing motor 33 to begin immediatey the active damping of the wobble of the space vehicle.

It will be apparent to those skilled in the art that the novel principles of the invention disclosed herein will suggest various other modifications and applications of the same. It is accordingly desired that the present invention shall not be limited to the specific embodiment thereof described herein.

What is claimed:

1. A stabilizing control mechanism for rotating space bodies comprising:
   a gyroscopic means including at least one rotating momentum wheel;
   means for sensing the wobble angle of the rotating space body;
   means activated by said sensing means for placing said gyroscopic means in a dynamic state wherein the angular momentum of the gyroscopic means is perpendicular to the vehicle spin axis and parallel to the nodal axis of precession of said space body; and
   energy absorbing means connected between said space body and said gyroscopic means whereby the excess kinetic energy causing the wobble is removed from said space body or transferred into other useful form.

2. A control system for rotating space body comprising:
   a control moment gyroscope having a rotating momentum wheel and a plurality of gimbles;
   a means for sensing the angle between the major principal axis and the angular momentum vector of the space body;
   means activated by said sensing means for rotating at least one of said gimbal means, said means rotating said gyroscope so that the total angular momentum of said gyroscope is perpendicular to the vehicle spin axis and parallel to the nodal axis of precession; and
   energy absorbing means connected between said space body and said gyroscopic means absorbing the excess kinetic energy of said space body.

3. An attitude control system to maintain the precession angle of a rotating space body below a predetermined value comprising:
   a gyroscopic system including at least one rotating momentum wheel and a plurality of gimbals;
   means for activating said gyroscopic means as a function of the precession angle, said means sensing said precession angle independent of the spin speed of said space body;

energy absorbing means connected between said gyroscopic means and said space body; and means for positioning said gyroscopic means so that the angular momentum vector of said gyroscopic means is perpendicular to the total angular momentum vector of said space body and parallel to the nodal axis of precession.

4. A control system as described in claim 3 wherein said gyroscopic system includes at least two momentum wheels.

5. An attitude control system to maintain the precession angle of a rotating space body below a predetermined value comprising:

a gyroscopic system including at least one rotating momentum wheel and a plurality of gimbals;

means for activating said gyroscopic means as a function of the precession angle, said means sensing said precession angle independently of the spin speed of said space body;

energy absorbing means connected between said gyroscopic means and said space body, said energy absorbing means comprising a viscous damped gimbal; and means for positioning said gyroscopic means whereby the angular momentum vector of said gyroscopic means is perpendicular to the total angular momentum vector of said space body and paralel to the nodal axis of precession.

6. An attitude control system to maintain the precession angle of a rotating space body below a predetermined value comprising:

a gyroscopic system including at least one momentum wheel and a plurality of gimbals;

means for activating said momentum wheel as a function of the precession angle, said means sensing that precession angle independently of the spin speed of said space body;

energy absorbing means connected between said gyroscropic means and said space body; and means for positioning and maintaining said gyroscopic means in a position that the angular momentum vector of said gyroscopic means is perpendicular to the total angular momentum vector of said space body and parallel to the nodal axis of precession.

References Cited

UNITED STATES PATENTS 3,116,035  12/1963  Cutler.
3,232,561  2/1966  Adams.
3,341,152  9/1967  Kantrowitz et al.

FERGUS S. MIDDLETON, Primary Examiner

U.S. Cl. X.R.

244—3.21, 3.23, 79